United States Patent
Komulainen et al.

(10) Patent No.: US 9,864,087 B2
(45) Date of Patent: Jan. 9, 2018

(54) CIRCUIT, TRANSMISSION SYSTEM AND METHOD FOR DETERMINING PROXIMITY OF AN OBJECT

(71) Applicant: Intel Corporation, Santa Clara, CA (US)

(72) Inventors: Mikko S. Komulainen, Tampere (FI); Saku Lahti, Tampere (FI)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/594,235

(22) Filed: Jan. 12, 2015

(65) Prior Publication Data

US 2015/0234077 A1  Aug. 20, 2015

(30) Foreign Application Priority Data

Feb. 14, 2014  (DE) ........................ 10 2014 101 906

(51) Int. Cl.
| | |
|---|---|
| *H04B 1/38* | (2015.01) |
| *H04B 7/00* | (2006.01) |
| *G01V 3/08* | (2006.01) |
| *G01V 3/12* | (2006.01) |
| *H04B 1/3827* | (2015.01) |
| *H04W 52/28* | (2009.01) |

(52) U.S. Cl.
CPC .................. *G01V 3/08* (2013.01); *G01V 3/12* (2013.01); *H04B 1/3838* (2013.01); *H04W 52/283* (2013.01)

(58) Field of Classification Search
CPC .......... G01V 3/08; G01V 3/12; H04B 1/3838; H04W 52/283
See application file for complete search history.

(56) References Cited

U.S. PATENT DOCUMENTS

| | | | |
|---|---|---|---|
| 9,247,504 B2 | 1/2016 | Erkens | |
| 2012/0322378 A1* | 12/2012 | Tai .......................... | H01Q 21/28 455/41.2 |
| 2013/0029625 A1* | 1/2013 | Park ....................... | H01Q 1/243 455/272 |
| 2013/0156080 A1* | 6/2013 | Cheng .................... | H01Q 1/243 375/222 |
| 2014/0162574 A1* | 6/2014 | Rousu .................... | H04W 52/04 455/78 |

FOREIGN PATENT DOCUMENTS

CN           103493352            1/2014

OTHER PUBLICATIONS

Non-Final Office Action received on May 18, 2017 in connection with U.S. Appl. No. 15/251,092.
Non-Final Office Action dated Nov. 27, 2017 in connection with U.S. Appl. No. 15/251,092.

* cited by examiner

*Primary Examiner* — Farhana Hoque
(74) *Attorney, Agent, or Firm* — Eschweiler & Potashnik, LLC

(57) ABSTRACT

A circuit includes a sensing circuit for a first antenna and a second antenna, the sensing circuit including an adjustable characteristic that is based on a proximity of an object to the first or second antenna used to transmit a transmit signal. An evaluation circuit is coupled to the sensing circuit. The evaluation circuit is configured to monitor the characteristic of the sensing circuit and to determine whether the characteristic fulfills a predetermined criterion.

16 Claims, 3 Drawing Sheets

CIRCUIT, TRANSMISSION SYSTEM AND METHOD FOR DETERMINING PROXIMITY OF AN OBJECT

CROSS REFERENCE TO RELATED APPLICATIONS

This application claims priority to German Patent Application number 102014101906.7 filed Feb. 14, 2014 and is hereby incorporated in its entirety.

FIELD

Examples relate to sensing circuits for proximity detection and to mobile telecommunication devices.

BACKGROUND

Applications in which the presence of an object in the vicinity of another object shall be determined, are numerous. For example, devices comprising transmitters to wirelessly transmit data signals using a wireless LAN standard or a mobile telecommunication standard, such as for example one of the releases of the mobile telecommunication standard, namely, the long-term evolution (LTE) standard, may require to decrease a power of the transmission signal when human tissue is in the vicinity of the transmit antennas. The Federal Communications Commission (FCC) and the European Telecommunications Standards Institute (ETSI) provide regulations for a maximum acceptable radiation intensity for human tissue. For example, a maximum specific absorption rate (SAR, W/kg) is not permitted to exceed. The SAR depends on the proximity of the tissue to the antennas used to radiate the signal and amount and form of the transmitted power. In order to be compliant with the provisions, several test cases have to be met. For example, the SAR must not exceed a predetermined threshold when human tissue or a measurement body having similar characteristics (an SAR phantom) is in direct contact with the investigated device at arbitrary locations thereof. In order to determine proximity of an object or, for example, human tissue to a device, capacitive sensors may be used. However, when proximity of an object to, for example, all six edges of a rectangular device is to be monitored, numerous sensors may be required, for example for tablet computers or mobile phones, amounting to considerable costs for the proximity detection. In the event of a determined proximity of an object or human tissue, the transmit power of a wireless communication device or of a transmitter within the device under investigation needs be reduced in order to meet the SAR requirements.

There may be a desire to provide for the possibility to determine proximity in a more efficient manner.

BRIEF DESCRIPTION OF THE DRAWINGS

Some embodiments of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, examples thereof are shown by way of example in the figures and will herein be described in detail. It should be understood, however, that there is no intent to limit further examples to the particular forms disclosed, but on the contrary, further examples are to cover all modifications, equivalents, and alternatives falling within the scope of the disclosure. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which examples belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
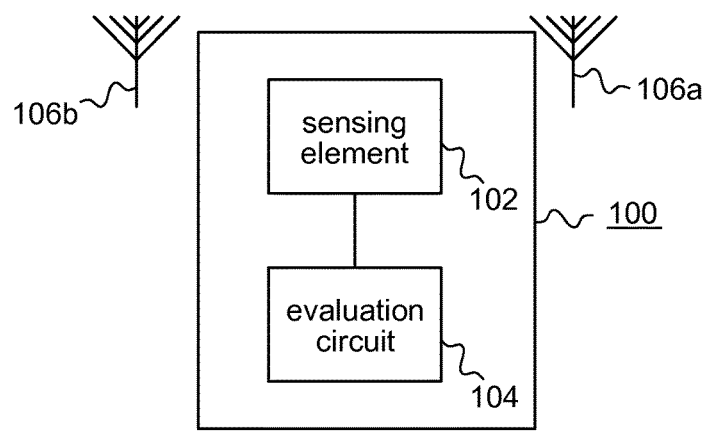
FIG. 1 illustrates an example of a circuit.

FIG. 1 illustrates an example of a circuit 100 comprising a sensing circuit 102 and an evaluation circuit 104. The sensing circuit 102 comprises an adjustable characteristic that is based or depending on a proximity of an object to the first or second antenna used to transmit a transmit signal. The sensing circuit 102 may have a characteristic that changes or is adjusted if an object is in the proximity of a transmit antenna used to transmit a transmit signal. The transmit antenna may be the first antenna 106a or the second antenna 106b. The antennas 106a and 106b are shown for illustrative purposes only in FIG. 1 and they are not necessarily part of the circuit 100 which serves to monitor proximity of an object to one of the antennas or to both antennas at a time. The evaluation circuit 104 is coupled to the sensing circuit 102 to monitor the characteristic of the sensing circuit 102. Providing a sensing circuit 102 whose characteristic changes if an object is in the proximity of the antenna used for transmission (the first antenna 106a or the second antenna 106b), a single sensing circuit 102 and an associated evaluation circuit 104 may be used to determine the presence of an object in the proximity of all antennas potentially used to transmit a signal. A single sensing circuit and associated evaluation circuit may be enough to cover continuous or alternating transmission by two antennas, which is a common use case in modern telecommunication applications using, for example, multiple input single output (MISO) or multiple input multiple output (MIMO) techniques. Having the sensing circuit changing its characteristic if an object is in the proximity of the first antenna 106a, the second antenna 106b or a combination of the first antenna 106a and the second antenna 106b may avoid the use of multiple proximity sensors within a single device, still accounting for all relevant use cases to be compliant with SAR requirements of, for example, FCC or ETSI.

According to some examples, the evaluation circuit 104 generates a proximity signal indicating the presence of an object in a vicinity of the transmit antenna of the first antenna 106a or of the second antenna 106b if the monitored characteristic fulfills a predetermined criterion. If, for example, the monitored characteristic is a capacitance of the sensing circuit or of a component of the same with respect to, for example, an enclosing casing or a ground plane of the device, a change of the capacitance may indicate that an object, for example a human body or human tissue, is in the vicinity of the antenna or the antennas used for transmission, The antenna or the antennas used for transmission may either be one of the first antenna or the second antenna, or the first antenna and the second antenna simultaneously. According to some examples, a transmitter used to generate a transmit signal to be transmitted by the first antenna and/or by the second antenna is controlled to reduce the power of the transmit signal or alternatively changing any other relevant parameter reducing the amount of effective transmitted power of the signal e.g. modulation or by changing transmitter's or antenna's operational mode, in response to the determined proximity. This may serve to comply with the SAR requirements in a MISO or MIMO system using only a single sensing circuit and an associated evaluation circuit. The described principles similarly applies also for systems consisting of more than two antennas.

A sensing circuit 102 may, for example, comprise two or more electrodes forming a capacitance which is measured or monitored by means of the evaluation circuit 104. The evaluation circuit 104 may, for example, be implemented within an integrated circuit (IC). Certain predefined or predetermined thresholds for the monitored capacitance may trigger power back-offs for the radios or the transmitters. That is, when predetermined threshold criteria for the capacitance are met, the transmission power of the transmitters (radios) may be decreased.

According to some examples, the power is decreased to a predetermined fixed level when a single threshold criterion is met. According to further examples, multiple threshold criteria are defined and the power is decreased in multiple steps, each step or level of transmit power corresponding to a single threshold criterion. According to further examples, the transmit power is continuously decreased depending on the determined proximity of the object to the transmit antenna, which corresponds to a distance to the first antenna or to the second antenna.

In using a single sensing circuit 102 whose characteristic changes if an object is in the proximity of a transmit antenna of the first antenna 106a or the second antenna 106b used to transmit a signal, multiple sensing circuits may not be required. Capacitive sensor electrodes or sensing circuits may, for example, have a reasonable size in the dimension of millimeters or centimeters when highly-sensitive signals or capacitance variations of a significant amount are desirable. Using an example of a circuit as described herein may save a significant amount of area within a mobile phone, a mobile telecommunications device, a tablet computer or the like. Costs and complexity may be decreased when only one set of electrodes is required. Also, multiple integrated circuits or a multiport-integrated circuit and the associated costs may be saved when proximity detection does not need to take place on multiple sides of a device.

The predetermined criterion upon which a transmission power is reduced in some embodiments may be individually adapted to the particular use case and geometry. For example, if a sensing circuit 102 is provided which has a capacitance depending on the relative position of matter or human tissue and the first antenna 106a, the second antenna 106b or a combination of the first antenna 106a and the second antenna 106b, the dependency of the capacitance of the sensing circuit 102 on the distance or the proximity of objects to the antennas is determined by the particular geometry or configuration. The course of the capacity may be calculated or measured. Further, the electromagnetic energy absorbed by an object depends on the distance of the object to the radiator, i.e. to the first antenna 106a and/or to the second antenna 106b. A given absorbed energy or SAR value so corresponds to a capacitance of the sensing circuit and the capacitance corresponding to an undesirable SAR value may be chosen as a threshold value or as the predetermined criterion that triggers a reduction of the power of the transmitter so as to not exceed the undesirable SAR value in operation. In other words, the predetermined criterion may correspond to a maximum of an acceptable absorption of electromagnetic energy radiated from one of the antennas by the object. In other words, the predetermined criterion may also correspond to a maximum of an acceptable distance of the object to one of the antennas or to components of the sensing circuit. Capacitance is only one example for a characteristic of a sensing circuit that may vary depending on the position of an object in the proximity of the antennas. Other sensor concepts may use different characteristics.

Figure 2:
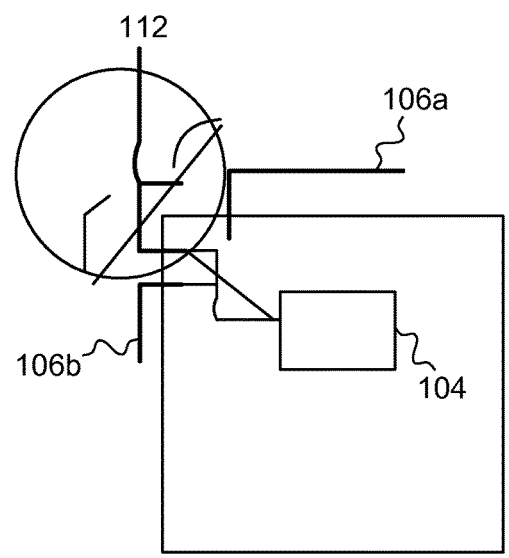
FIG. 2 illustrates a further example of a circuit for determining the proximity of an object to a first or a second antenna using a third antenna.

FIG. 2 illustrates an example in which the sensing circuit comprises an antenna 112 for receiving a signal of a first signal type while the first antenna 106a and the second antenna 106b are used to receive or transmit signals of a second signal type which is different than the first signal type. That is, for example, an already existing receive antenna for another application may be used as a part of the sensing circuit so as to save additional area. A high mutual isolation between the sensing circuit and one of the antennas 106a and 106b may be achieved when an antenna is part of the sensing circuit which is only used to receive signals instead of antennas furthermore transmitting signals. If, for example, WLAN or cellular transmission systems are considered, a capacitance change of one of the antennas radiators may be determined with a much lower frequency than the frequency of the radio frequency signal transmitted by means of the antennas. High intermodulation distortion may be caused within the evaluation circuit if small fractions of the radio frequency transmit power of WLAN or cellular transmission is coupled to the sensing circuit and propagated into the evaluation circuit if the first antenna 106a or the second antenna 106b was part of the sensing circuit. Even minor amounts of transmit power may cause a significant intermodulation distortion if it propagates through a blocking circuit to the nonlinear sensing circuit 102 and its associated evaluation circuit 104. Using a receive only antenna 112 as part of the sensing circuit's electrode may serve to avoid intermodulation distortions, in particular when the antenna is configured to receive a signal of a different signal type than the first antenna 106a and the second antenna 106b since cross coupling from the antennas 106a and 106b to the antenna 112 may then be reduced. In the example of FIG. 2, the antenna 112 may, for example, be operable to receive a signal from global positioning system (GPS) satellites, while the antennas 106a and 106b may be used to transmit wireless LAN or mobile telecommunication signals at radio frequencies within the range of 700 MHz to 6 GHz.

For example, in a MISO system, the first antenna 106a may serve to simultaneously transmit a transmit signal generated by a transmitter and to receive a first receive signal of the MISO system, while the second antenna 106b may be configured to receive a second receive signal of the MISO system. Using an antenna 112 arranged in between both of the antennas 116a and 116b and configured to receive a receive signal of a different signal type than the receive signals for the antennas 116a and 116b may provide for a distortion-free determination of the proximity of objects to the antennas 106a and 106b and, at the same time, avoid intermodulation distortions which may occur when a transmit antenna is used as part of the sensing circuit or when cross coupling between the antennas 106a or 106b and antenna 112 occurs otherwise.

According to some examples, this allows to cover multiple input multiple output scenarios where both of the antennas 106a and 106b are simultaneously used for transmission which may demand a minimum distance between the first antenna 106a and the second antenna 106b in order to avoid overlapping SAR hotspots. An overlapping hotspot is a position here means that sum of SAR values caused by the first antenna and the second antenna is notably higher than SAR value caused by either the first antenna or the second antenna alone. Using an antenna 112 in between the antennas 106a and 106b utilized for transmission may nonetheless cover the detection of a proximity to both transmit antennas and, hence, to both components within the system which are significant for the generation of the signal being potentially harmful for human tissue.

While some scenarios may use only one fixed predetermined antenna within a MISO set up for transmission or as a transmit antenna, other scenarios may dynamically choose which one of multiple available antennas shall be used for the transmission while the other antennas are used for reception only, depending on the environment and the signal characteristics.

In other words, the example illustrated in FIG. 2 utilizes three or more antennas to reduce the number of evaluation circuits 104 or sensor ICs. An antenna 112 used for signal reception purposes only may be placed between two transmitting antennas 106a and 106b and used as a part of a sensing circuit coupled to an evaluation circuit 104 or a sensor circuit or IC. When two or more transmit antennas are used, their relative spacing may be larger than the spacing between a transmit and a receive antenna pair since two transmit antennas may otherwise create the overlapping SAR hotspots which, in turn, would require a much higher degradation of the transmit power in order to be compliant with the requirements. In order to avoid such a type of scenario, a spacing between the two transmit antennas may be increased. This may enables the use of a third antenna for a different signal type in between the two antennas 106a and 106b without the requirement for additional space. This may also result in a better isolation between the proximity sensor IC and the transmitters and so may serve to avoid intermodulation distortions because reduced amount of RF power is coupled to the sensor IC. The intermodulation distortion may further couple to receivers of the device and cause severe de-sense. Coupling of radio frequency power into the sensor circuit or evaluation circuit may otherwise result in a wrong sensor reading which might even result in complete jamming of the transmitters, i.e. in a strong decrease of the transmit power becoming too small to be received by the receiver side of the communication performed using the transmitter.

Figure 3:
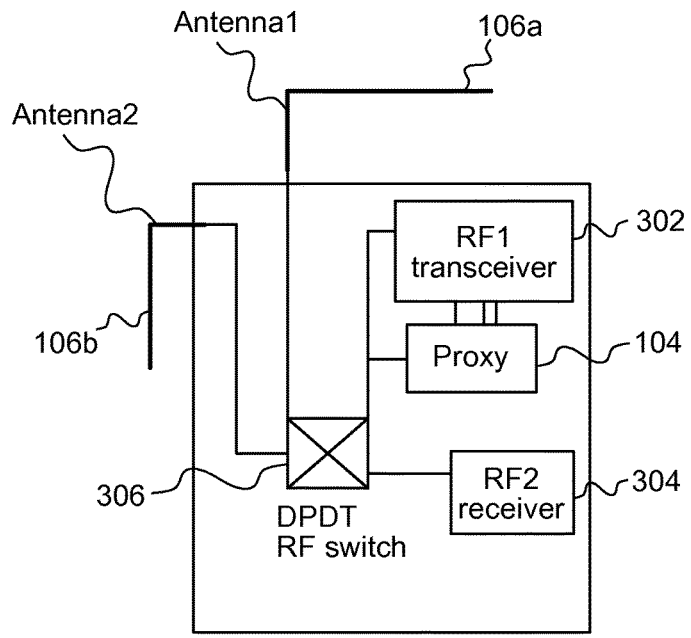
FIG. 3 illustrates a further example of a circuit for determining proximity.

FIG. 3 schematically illustrates one particular example for such a system comprising a first antenna 106a and a second antenna 106b. A transceiver 302 is configured to simultaneously transmit and receive signals, while a receiver 304 is configured to receive a signal without having the capability to generate a transmission signal. The transceiver 302, the receiver 304, the first antenna 106a and the second antenna 106b are coupled to a signal switching element 306 (radio frequency switch) being configured to selectively couple the transceiver 302 to the first antenna 106a and the receiver to the second antenna 106b and vice-versa. Depending on the particular antenna characteristics and the mode of operation, either the first antenna 106a or the second antenna 106b is used for transmission while the other antenna is used for reception purposes only.

The evaluation circuit 104 is coupled to the transceiver's 302 signal path so that always the sending or transmitting antenna becomes part of the sensing circuit. That is, the switching entity or signal switching element 306 couples the transceiver circuit 302 to the first antenna 106a or to the second antenna 106b, while the evaluation circuit 104 is coupled to the transceiver 302 so that the sensing circuit comprises the first antenna 106a if the first antenna is used to transmit a signal or the sensing circuit comprises the second antenna 106b if the second antenna is used to transmit the signal. The antenna used for transmission automatically becomes part of the sensing circuit so that a tissue in the vicinity of the transmitting antenna is automatically sensed in the vicinity of the component from which the radiation originates from. One evaluation circuit 104 may be sufficient to cover both scenarios in a multiple input single output system to fulfill the SAR requirements.

In other words, FIG. 3 illustrates a circuit where a low frequency sensor signal evaluated by means of the evaluation circuit 104 is combined to the high frequency radio frequency signal in a scheme where a transceiver or main transceiver 302 and a diversity receiver 304 are swapped between an antenna pair by means of a signal switching element 306 or radio frequency switch. The sensor signal is combined to the transceiver's radio frequency signals before the switch 306 and in this manner proximity information is always achieved from the antenna which is used for the transmission. Configurations illustrated in FIG. 3, where antenna transceiver/receiver pairs are swapped using a double-pole double-throw (DPDT) RF switch may be found in some application scenarios. Those kinds of arrangements may, for example, be used in some devices in order to enhance radiated performance for different use cases and/or user's grips on the device. The transceiver and receiver pair can, for example, be a main cellular (transmit and receive) and a diversity/MIMO cellular (receive only). In such a use case, the sensor signal may be combined to the radio frequency signal of the transceiver 302 before the signal switching element 306. The sensor signal is then always driven to the transmitting antenna, which is the antenna whose input power is to be controlled to comply with the SAR requirements. One proximity sensor or one single evaluation circuit 104 may be used for covering the area of two antennas 106a and 106b.

Figure 4:
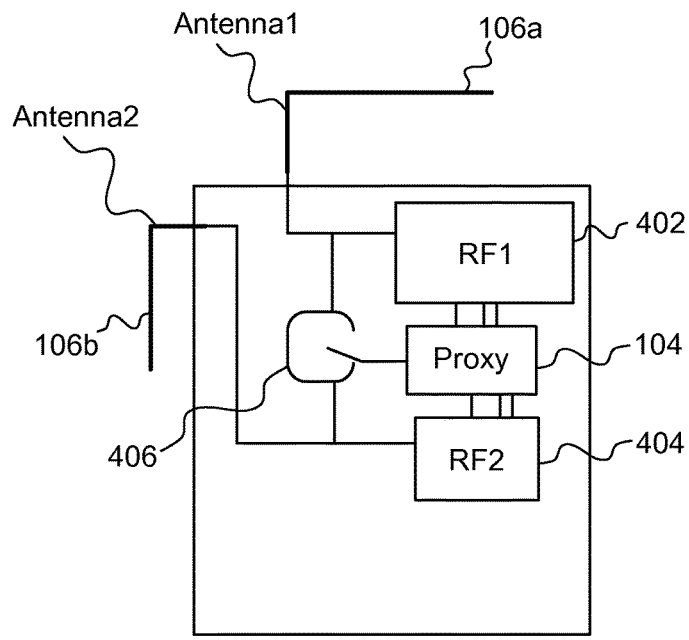
FIG. 4 illustrates a further example for determining proximity.

FIG. 4 illustrates a further example being, for example, also usable with multiple input multiple output systems, i.e. with systems where the first antenna 106a and the second antenna 106b are simultaneously used for transmission and reception of signals. In the example illustrated in FIG. 4, a switching element 406 is used to couple the first antenna 106a to the evaluation circuit 104 at a first time instant and to couple the second antenna 106b to the evaluation circuit 104 at a second time instant. That is, the evaluation circuit 104 is coupled to either one of the antennas 106a and 106b so that both antennas become part of the sensing circuit at different time intervals. Also for multiple input multiple output scenarios, a single evaluation circuit or sensor IC 104 may be sufficient to monitor the proximity of objects or human tissue to the radiators or antennas used for transmitting or sending radio frequency signals which enables the system to become compliant with the SAR requirements. According to some examples, the switching element 406 alternatingly couples the evaluation circuit 104 to the first antenna 106a and to the second antenna 106b so as to be able to avoid the generation of high SAR values caused by either one of the two antennas 106a and 106b using only one single evaluation circuit 104. In further examples, the example of FIG. 4 is also used in MISO applications.

FIG. 4 illustrates an example where one proximity sensor signal is combined to two or more antennas 106a and 106b alternatingly or synchronously. That is, the sampling of the signal by means of the evaluation circuit 104 may be synchronized and two or more proximity sensor electrodes of sensing circuits comprising the antenna's radiators may be used with one single evaluation circuit 104. In the example illustrated in FIG. 4, a single proximity sensor or evaluation circuit 104 is provided with a signal path to two or more antennas 106a and 106b at a time. The sensor signal may be synchronously sampled to each of the antennas 106a and 106b and proximity data from multiple electrode pairs or for multiple antennas can be gathered or determined by means of a single evaluation circuit 104 or sensor IC.

Figure 5:
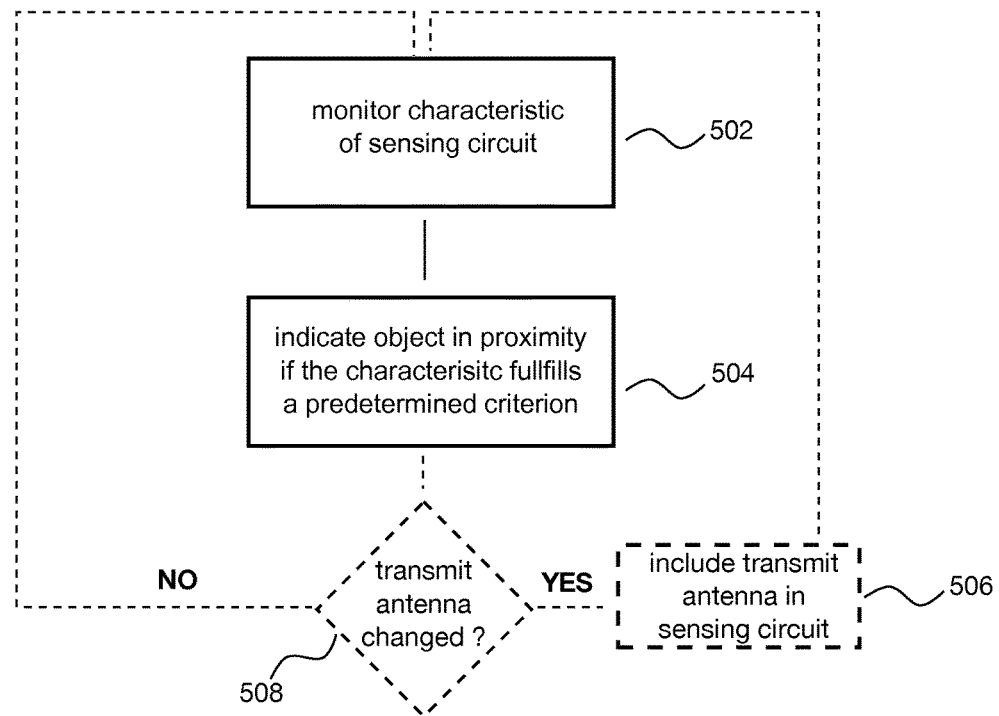
FIG. 5 illustrates a flowchart of an example of a method for determining proximity of an object to a first antenna and to a second antenna.

FIG. 5 illustrates an example of a method for determining proximity of an object to a first antenna or to a second antenna usable to transmit a transmit signal by means of a block diagram. During monitoring 502, a characteristic of a sensing circuit is monitored, the sensing circuit having a characteristic changing if an object is in a proximity of a transmit antenna used to transmit a transmit signal, the transmit antenna being the first antenna or the second antenna. FIG. 5 further illustrates indicating that an object in the proximity of the transmit antenna if it the characteristic of the sensing circuit fulfills a predetermined criterion.

Some examples of methods relate to MISO systems dynamically choosing one of the two antennas as the transmit antenna used for transmission of the transmit signal. That is, one antenna is used for transmission and reception while the other antenna is used for reception only and the roles may change. FIG. 5 further illustrates the optional determining 508 whether the transmit antenna used to transmit the transmit signal has changed. If not, monitoring 502 may continue. If the transmit antenna has changed, optional including 506 of the antenna used to transmit the transmit signal into the sensing circuit may be performed.

Figure 6:
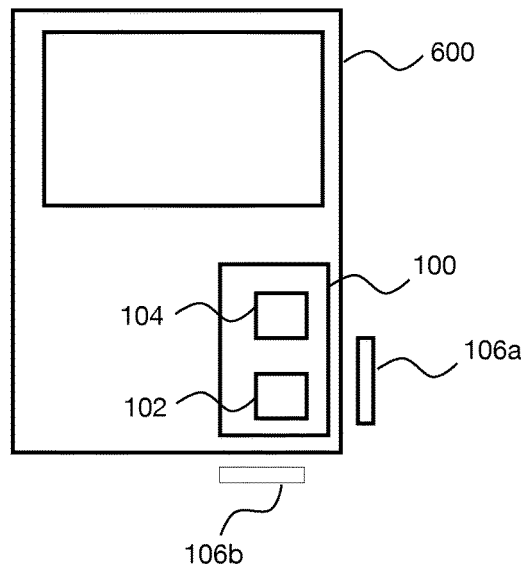
FIG. 6 illustrates an example of a mobile telecommunications device.

FIG. 6 schematically illustrates an example of a mobile telecommunications device or User Equipment by means of a mobile handset 600 having a first antenna 106a and a second antenna 106b. The mobile handset 600, which may for example be a smartphone, comprises a circuit 100 having a sensing circuit 102 and an evaluation circuit 104. The sensing circuit 102 has a characteristic that changes if an object is in the proximity of the first antenna 106a or of the second antenna 106b used to transmit a signal. The evaluation circuit 104 is coupled to the sensing circuit 102 to monitor the characteristic of the sensing circuit 102 and to allow to reduce transmit power of the handset's radio frequency transmitter if proximity of an object or of human tissue to the first antenna (106a), to the second antenna (106b) or to the first antenna (106a) and the second antenna (106b) is determined using circuit 100.

While the previous examples have been detailed using two antennas 106a and 106b, further examples may also use a greater number of antennas in other configurations. For example, three antennas may be used which are configured for a MIMO configuration using three or more antennas, as for example described for some WLAN applications. Moreover, while the previous examples have been mainly described for applications in mobile telecommunication networks or wireless communication systems, further examples may also be used for other wireless transmission techniques, such as for example within one of the 3GPP-standardized mobile communication networks, where the term mobile communication system is used synonymously to mobile communication network. The mobile or wireless communication system may correspond to, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc. Further examples of receiver systems or tuning circuits may also be used in connection with other wireless communication standards or protocols, such as for example Bluetooth, ZIGBEE or the like.

Examples may further provide a computer program having a program code for performing one of the above methods, when the computer program is executed on a computer or processor. A person of skill in the art would readily recognize that steps of various above-described methods may be performed by programmed computers. Herein, some examples are also intended to cover program storage devices, e.g., digital data storage media, which are machine or computer readable and encode machine-executable or computer-executable programs of instructions, wherein the instructions perform some or all of the acts of the above-described methods. The program storage devices may be, e.g., digital memories, magnetic storage media such as magnetic disks and magnetic tapes, hard drives, or optically readable digital data storage media. The examples are also intended to cover computers programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and examples of the disclosure, as well as specific examples thereof, are intended to encompass equivalents thereof.

Functional blocks denoted as "means for . . . " (performing a certain function) shall be understood as functional blocks comprising circuitry that is configured to perform a certain function, respectively. Hence, a "means for s.th." may as well be understood as a "means configured to or suited for s.th.". A means configured to perform a certain function does, hence, not imply that such means necessarily is performing the function (at a given time instant).

Functions of various elements shown in the figures, including any functional blocks labeled as "means", "means for providing a sensor signal", "means for generating a transmit signal.", etc., may be provided through the use of dedicated hardware, such as "a signal provider", "a signal processing unit", "a processor", "a controller", etc. as well as hardware capable of executing software in association with appropriate software. Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some examples a single act may include or may be broken into multiple sub acts. Such sub acts may be included and part of the disclosure of this single act unless explicitly excluded.

What is claimed is:

1. A circuit, comprising:
a sensing circuit for a first antenna and a second antenna which concurrently participate in a communication, wherein the sensing circuit comprises an adjustable characteristic that is based on a proximity of an object to the first or second antenna used for transmission of a transmit signal, and wherein the sensing circuit comprises the first antenna or the second antenna;
an evaluation circuit coupled to the sensing circuit, the evaluation circuit being configured to monitor the characteristic of the sensing circuit and to determine whether the characteristic fulfills at least one of a predetermined set of criteria; and
a switching element configured to operatively couple the evaluation circuit to the first antenna during a first time interval and to operatively couple the evaluation circuit to the second antenna during a second time interval.

2. The circuit of claim 1, wherein the switching circuit is configured to transmit selectively the adjustable characteristic from the first antenna and second antenna to the evaluation circuit.

3. The circuit of claim 1, wherein the sensing circuit comprises the first antenna if the first antenna is used to transmit the signal or wherein the sensing circuit comprises the second antenna if the second antenna is used to transmit the signal.

4. The circuit of claim 1, wherein the switching element alternatingly couples the evaluation circuit to the first antenna and to the second antenna.

5. The circuit of claim 1, further comprising a transmitter configured to generate the transmit signal to be transmitted by the first antenna or by the second antenna.

6. The circuit of claim 5, wherein the transmitter is configured to reduce a power of the transmit signal if the characteristic fulfills the predetermined criterion.

7. The circuit of claim 5, further comprising a signal switching element configured to couple the transmitter to the first antenna or to the second antenna, wherein the evaluation circuit is coupled to the transmitter.

8. The circuit of claim 1, wherein the evaluation circuit generates a proximity signal indicating the presence of an object in a vicinity of the first antenna or the second antenna if the characteristic fulfills the predetermined criterion.

9. The circuit of claim 1, wherein the evaluation circuit monitors a capacitance between an element of the sensing circuit and a reference potential.

10. The circuit of claim 1, wherein the predetermined criterion corresponds to an acceptable absorption of electromagnetic energy by the object.

11. A circuit, comprising:
a sensing circuit for a first antenna and a second antenna, wherein the sensing circuit comprises an adjustable characteristic that is based on a proximity of an object to the first or second antenna used to transmit a transmit signal; and
an evaluation circuit coupled to the sensing circuit, the evaluation circuit being configured to monitor the characteristic of the sensing circuit and to determine whether the characteristic fulfills a predetermined criterion,
wherein the sensing circuit comprises a sensing electrode coupled to the evaluation circuit, the sensing electrode being arranged between the first antenna and the second antenna.

12. The circuit of claim 11, wherein the sensing electrode comprises an antenna configured to receive a first receive signal, wherein the antenna is separate from and different than the first antenna and the second antenna, and the first receive signal being different than the receive signals received by the first antenna and by the second antenna.

13. A circuit, comprising:
a sensing circuit configured to couple to a first antenna and a second antenna, wherein the sensing circuit comprises an adjustable characteristic that is based on a proximity of an object to the first or second antenna used to transmit a transmit signal when coupled thereto; and
an evaluation circuit coupled to the sensing circuit, wherein the evaluation circuit monitors the adjustable characteristic of the sensing circuit and determine whether the adjustable characteristic fulfills a predetermined criterion;
wherein the evaluation circuit determines whether the first antenna or the second antenna is to be used to transmit the transmit signal based on a previous state of an antenna configuration and a current state of the antenna configuration;
wherein the antenna configuration comprises the first antenna connected selectively to one of a transceiver and a receiver, and the second antenna connected selectively to the other one of the transceiver and the receiver.

14. The circuit of claim 13, further comprising:
a switching circuit electrically connected to the first antenna and the second antenna to transmit the adjustable characteristic from the first antenna and second antenna to the sensing circuit.

15. The circuit of claim 13, further comprising:
the transceiver configured to transmit the transmit signal to and receive a first receive signal from either the first antenna or the second antenna based on the adjustable characteristic, the previous state of the antenna configuration and the current state of the antenna configuration;
the receiver configured to receive a second receive signal from either the first antenna or the second antenna.

16. The circuit of claim 13, wherein a transceiver circuit is configured to reduce a power of the transmit signal if the adjustable characteristic fulfills the predetermined criterion.

* * * * *